(12) United States Patent
Guidice et al.

(10) Patent No.: US 6,430,540 B1
(45) Date of Patent: Aug. 6, 2002

(54) METHOD AND SYSTEM FOR MONITORING AND MODIFYING A CONSUMPTION FORECAST OVER A COMPUTER NETWORK

(75) Inventors: Rebecca R. Guidice; Aaron M. Linz, both of Charlotte, NC (US); Michelle P. Large, McMurray, PA (US); Matthew G. Santomenna, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/498,465

(22) Filed: Feb. 4, 2000

Related U.S. Application Data

(60) Provisional application No. 60/173,717, filed on Dec. 30, 1999.

(51) Int. Cl.[7] ................................................ G06F 15/20
(52) U.S. Cl. .......................................... 705/28; 705/29
(58) Field of Search ............................... 705/26, 28, 29

(56) References Cited

U.S. PATENT DOCUMENTS

| | | | |
|---|---|---|---|
| 5,063,507 A | | 11/1991 | Lindsey et al. |
| 5,285,383 A | | 2/1994 | Lindsey et al. |
| 5,319,542 A | | 6/1994 | King et al. |
| 5,712,989 A | * | 1/1998 | Johnson et al. ............. 395/228 |
| 5,774,873 A | | 6/1998 | Berent et al. |
| 5,809,479 A | * | 9/1998 | Martin et al. ................. 705/11 |
| 5,819,232 A | * | 10/1998 | Shipman ........................ 705/7 |
| 5,930,763 A | * | 7/1999 | Kaneko et al. ................. 705/8 |
| 5,960,408 A | * | 9/1999 | Martin et al. ................. 705/11 |
| 5,963,915 A | | 10/1999 | Kirsch et al. |
| 5,963,919 A | * | 10/1999 | Brinkley et al. .............. 705/28 |
| 5,974,395 A | * | 10/1999 | Bellini et al. ................. 705/28 |
| 6,029,140 A | * | 2/2000 | Martin et al. ................. 705/11 |
| 6,078,900 A | * | 6/2000 | Ettl et al. ...................... 705/28 |

FOREIGN PATENT DOCUMENTS

JP          1-307803 A    * 12/1989    ................. 705/29

OTHER PUBLICATIONS

Wesco, International, Inc. article "National Distribution Team Announces Unique National Stocking Program", May 30, 2001 printed from the Gale Group Trade & Industry Database.*

* cited by examiner

Primary Examiner—Douglas Hess
(74) Attorney, Agent, or Firm—John B. Yates, Esq.; Robin C. Clark, Esq.; Hunton & Williams

(57) ABSTRACT

A method and system for enabling commercial web site users to monitor and display a consumption forecast for an established stocking program, wherein a stocking program is an agreement between a supplier and a customer that guarantees availability and consumption of a stocking program item based upon an established consumption forecast for the item. The user can review the current consumption forecast and additional details of an established stocking program and request modification of the forecast as desired.

12 Claims, 2 Drawing Sheets

METHOD AND SYSTEM FOR MONITORING AND MODIFYING A CONSUMPTION FORECAST OVER A COMPUTER NETWORK

CROSS REFERENCE TO RELATED APPLICATIONS

This application claims the benefit of provisional patent application Ser. No. 60/173,717 filed Dec. 30, 1999, the disclosure of which is incorporated herein by reference.

BACKGROUND OF THE INVENTION

The present invention relates generally to conducting electronic commercial transactions over a computer network. More particularly, the present invention relates to a web site wherein a customer can view and modify a consumption forecast of an established stocking program over a computer network.

Electronic commerce systems for conducting commercial transactions over a distributed computer network, such as the Internet, are shown and described in numerous U.S. Patents, including U.S. Pat. Nos. 5,285,383 and 5,063,507 to Lindsey et al., U.S. Pat. No. 5,963,915 to Kirsch et al., U.S. Pat. No. 5,319,542 to King, Jr. et al., and U.S. Pat. No. 5,774,873 to Berent et al.

U.S. Pat. No. 5,963,915 to Kirsch et al. discloses a system and method for performing Internet transactions between a client browser and a merchant server. The method includes establishing a coded identifier (i.e., a cookie) on the browser which corresponds to an account record stored on the server; providing a web page including a URL identifying an item for sale to the browser; receiving the URL, with a reference to the coded identifier, at the merchant server; validating the coded identifier; and recording the identity of the corresponding item. The method is intended to avoid redundant user input, to provide for secure transactions, and to increase transaction efficiencies. The patent further discloses techniques for providing additional levels of authentication and security, restrictions on shipping destination, and e-mail confirmation of orders. The determination of when to send a confirmation can be made subject to the dollar amount of the purchase, user's purchase history, or other criteria selected by the vendor server.

U.S. Pat. No. 5,319,542 to King, Jr. et al. discloses a system for ordering items from a supplier. The system includes an electronic catalogue and an electronic requisition facility. The catalogue includes a public-access portion, stored on a publicly-accessible database for access by customers, and a private portion, stored on a customer's computer system. The private portion contains unique pricing data based on pricing agreements. Customers use the electronic requisition facility to create purchase requisitions based on the information in the electronic catalogue. The requisitions are routed through an appropriate approval process, processed through the customer's procurement system, and transmitted to the supplier.

Electronic commercial transactions such as those described in King, Jr. et al. commonly take place over the World Wide Web. The World Wide Web is a collection of servers connected to the Internet that utilize the Hypertext Transfer Protocol ("HTTP"). This protocol permits documents (commonly referred to as web pages) written in a standard mark-up language (e.g., html) to be transmitted across the Internet from remote server computers to client computers, even where such remote and client computers share different operating systems or platforms. A browser application running on the client computer then translates the commonly formatted documents and displays them to the user. Groups of commonly owned and related web pages are referred to as web sites and provide online customers with the ability to select the individual content they wish to view without necessarily viewing all the content published by the site owner.

Although systems for implementing electronic commercial transactions, such as those described in King Jr., et al. are known in the art, these systems are typically focused toward the retail environment in which individual purchasers order products from an online retailer on an "as needed" basis. Conversely, in the realm of bulk material purchases and business-to-business commercial transactions, it is common for purchasers to order large quantities of materials, based upon a usage forecast or consumption schedule. In fulfillment of such business needs, a supplier may offer the purchaser a variety of ordering methods including conventional one-time orders as well as complex ordering methods such as standing and blanket orders and stocking programs.

A conventional one-time order is simply an order by a purchaser for a particular quantity of product to be wholly delivered at a particular place and time. This is substantially analogous to the "as-needed" retail model discussed above. A standing order, conversely, is an order by a purchaser for a particular quantity of material to be delivered at regular intervals (e.g., 1000 lbs. per month, every month). Typically, standing orders include a defined ending date, however, this date may be extended through mutual agreement of the supplier and purchaser. A blanket order is an agreement between the purchaser and the supplier wherein the purchaser agrees to take a certain quantity of a product within a predetermined time period and the supplier agrees to reserve that quantity of product for the purchaser, thereby guaranteeing both the sale to the supplier as well as the availability to the purchaser.

Stocking programs are similar to standing and blanket orders in that a supplier agrees to always deliver a given product within a certain amount of time, upon demand by the purchaser. In this manner, stocking programs guarantee product availability to a purchaser without requiring an excessive inventory of the product to be stored on the purchaser's site. Typically involved in stocking programs are estimates as to the amount of product a purchaser will require in a given time period. Initially, this estimate is provided by the purchaser in the form of an initial consumption forecast. However, following a predetermined period of time, the supplier may revise the consumption forecast in accordance with the actual demands of the purchaser. In this manner, the supplier can more accurately predict the future consumption of the purchaser.

Standing and blanket ordering programs as well as stocking programs are suitable for large businesses that require regular deliveries of materials, but who do not wish to inventory the materials on site. Further, these types of orders alleviate the need for purchasers to place repeated orders for identical materials. Rather, the purchaser may simply request a release of materials as part of the pre-established complex order. Based upon the needs of a particular purchaser, different ordering methods are more appropriate than others.

Two examples of complex ordering systems may be found in U.S. Pat. Nos. 5,771,172 to Yamamoto et al. and 6,006, 196 to Feigin et al. U.S. Pat. No. 5,771,172 to Yamamoto et al. discloses a raw materials ordering system wherein production quantities of raw materials are determined in accordance with changing production plans. The ordering system receives sales information from retail outlets and manufactures products in response to the received sales information. This system, which determines the order size of each raw material according to a production plan for a product, comprises an order quantity determining means which sequentially sets or modifies the required quantities of raw materials for each day in accordance with the daily production plan or changes in the production plan and determines the order size in accordance with the attributes, inventories, order backlogs and in-process quantities of the raw materials and said required quantities of raw materials and a data input processing means which modifies said inventory quantities in response to raw material acceptance information and modifies said production plan and raw material inventory quantities in response to production data. This eliminates the need for the supplier to maintain large raw material inventories.

U.S. Pat. No. 6,006,196 to Feigin et al. discloses a method of planning and managing inventory in distribution systems. The disclosed system utilizes enhanced DRP (distribution resource planning) logic to predict future inventory requirements. The enhancement to conventional DRP includes taking future demand variability into consideration when making the prediction. This is done using several distinct statistical algorithms. By utilizing future demand variability, the system enhances performance projection capabilities so as to reduce the likelihood that a proper inventory will be maintained.

Although a myriad of different product ordering and inventory management systems are known, the issue of convenience and efficiency remains in the electronic commercial transaction environment. Typically, product orders, as well as any additions and modifications to the orders, are placed in writing or over the telephone, and are often accompanied by additional ancillary determinations such as a determination regarding the credit worthiness of the purchaser or a determination regarding the payment method being utilized. These conventional forms of communication often result in substantial delays between the date an order is placed or modified, and the effect date of the order or modification. There remains a clear need in the realm of business-to-business electronic commercial transactions to provide for increased convenience in monitoring and modifying complex orders, particularly those which arise out of established stocking programs.

BRIEF SUMMARY OF THE INVENTION

The present invention overcomes the problems noted above, and provides additional advantages, by providing a method and system for enabling purchasers in electronic commercial transactions to monitor and modify the consumption forecast of established stocking programs. A method in accordance with an exemplary embodiment of the invention is performed by providing, through a web site on the World Wide Web, a means for determining the identity of a user. Upon identification of the user, the user may select a stocking program option, which results in a listing of all of the user's previously established stocking programs. The user may then select a particular stocking program and view the details of the selected stocking program. The user may then initiate electronic communication with the supplier to modify the stocking program.

Methods, systems and programs in accordance with the present invention greatly increase the efficiency and convenience of participating in stocking programs for bulk materials, such as chemicals, by reducing or eliminating the need to interact, either orally or in writing, with a customer service representative. Further, the present invention provides for increased convenience in monitoring the consumption forecast established for a given stocking program.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
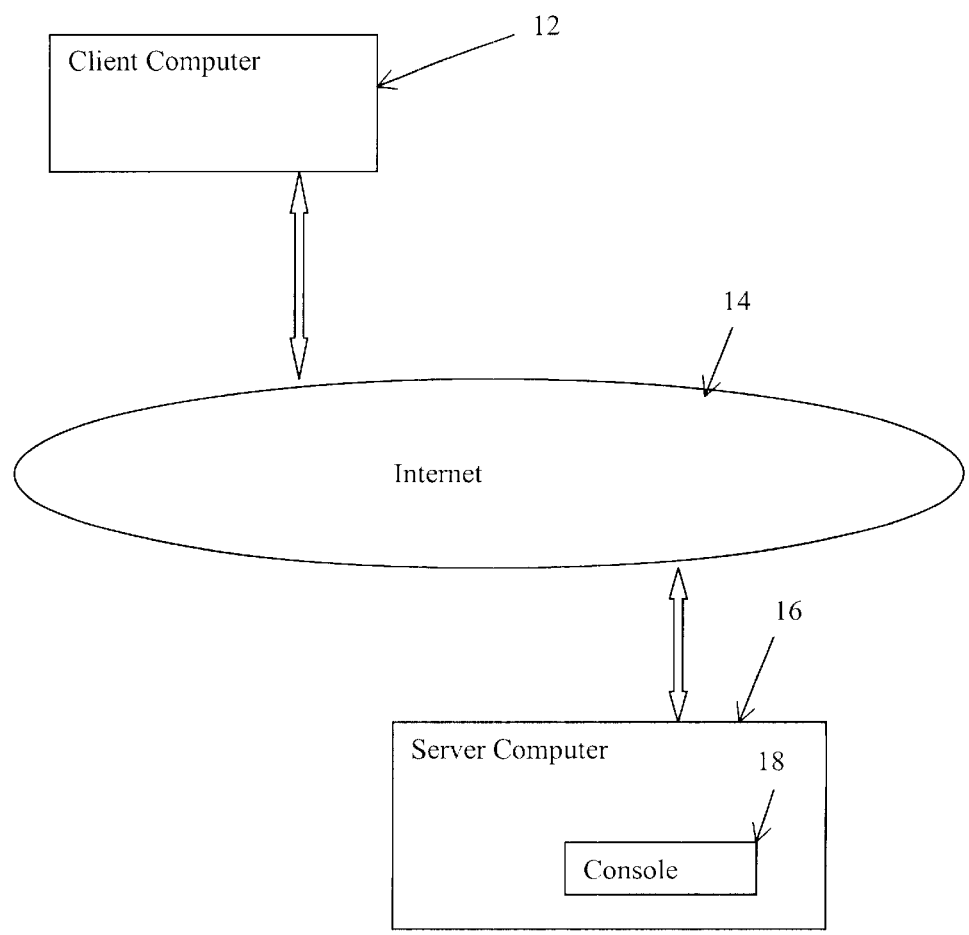
FIG. 1 is a block diagram of a computer network suitable for implementing a method according to the present invention.

A computer system 10 connected to a computer network such as the Internet is generally illustrated in FIG. 1. A conventional client computer system 12 (hereinafter "client") owner by a customer, executes a client browser application that supports the HTTP protocol, (e.g., Internet Explorer™, available from Microsoft Corporation). The client 12 is typically connected through an Internet Service Provider (ISP) to the Internet 14. A supplier owned server computer system 16 (hereinafter "server") is also coupled typically through an Internet Service Provider to the Internet 14. The server 16, controlled by a local console 18, executes a web server application and also hosts at least one web page for distribution over the Internet.

The client 12 requests a web page by issuing a URL request through the Internet 14 to the server system 16. A URL consistent with the present invention may be a simple URL of the form:

<protocol_identifier>://<server_path>/<web_page_path>

A "protocol_identifier" of "http" specifies the conventional hyper-text transfer protocol. A URL request for a secure Internet transaction typically utilizes the secure protocol identifier "https," assuming that the client browser and web server are presumed to support and implement the secure sockets layer (SSL). The "server_path" is typically of the form "prefix.domain," where the prefix is typically "www" to designate a web server and the "domain" is the standard Internet subdomain.top-level-domain of the server 16. The optional "web_page_path" is provided to specifically identify a particular hyper-text page maintained by the web server.

In response to a received URL identifying an existing web page, the server 16 returns the web page, subject to the HTTP protocol, to the client 12. This web page typically incorporates both textural and graphical information including embedded hyper-text links (hereinafter "hyperlink") that permit the client user to readily select a next URL for issuance to the Internet 14.

The URL issued from the client 12 may also be of a complex form that identifies a common gateway interface (CGI) program on server 16. Such a HTML hyperlink reference is typically of the form:

<form action="http://www.vendor.com/cgi-bin/logon.cgi" method=post>

A hyperlink of this form directs the execution of the logon.cgi program on an HTTP server in response to a client side selection of a hyperlink. A logon form supported by a logon CGI program is typically used to obtain a client user login name and password to initiate an authenticated session between the client browser and Web server for purposes of supporting, for example, a secure purchase transaction.

Figure 2:
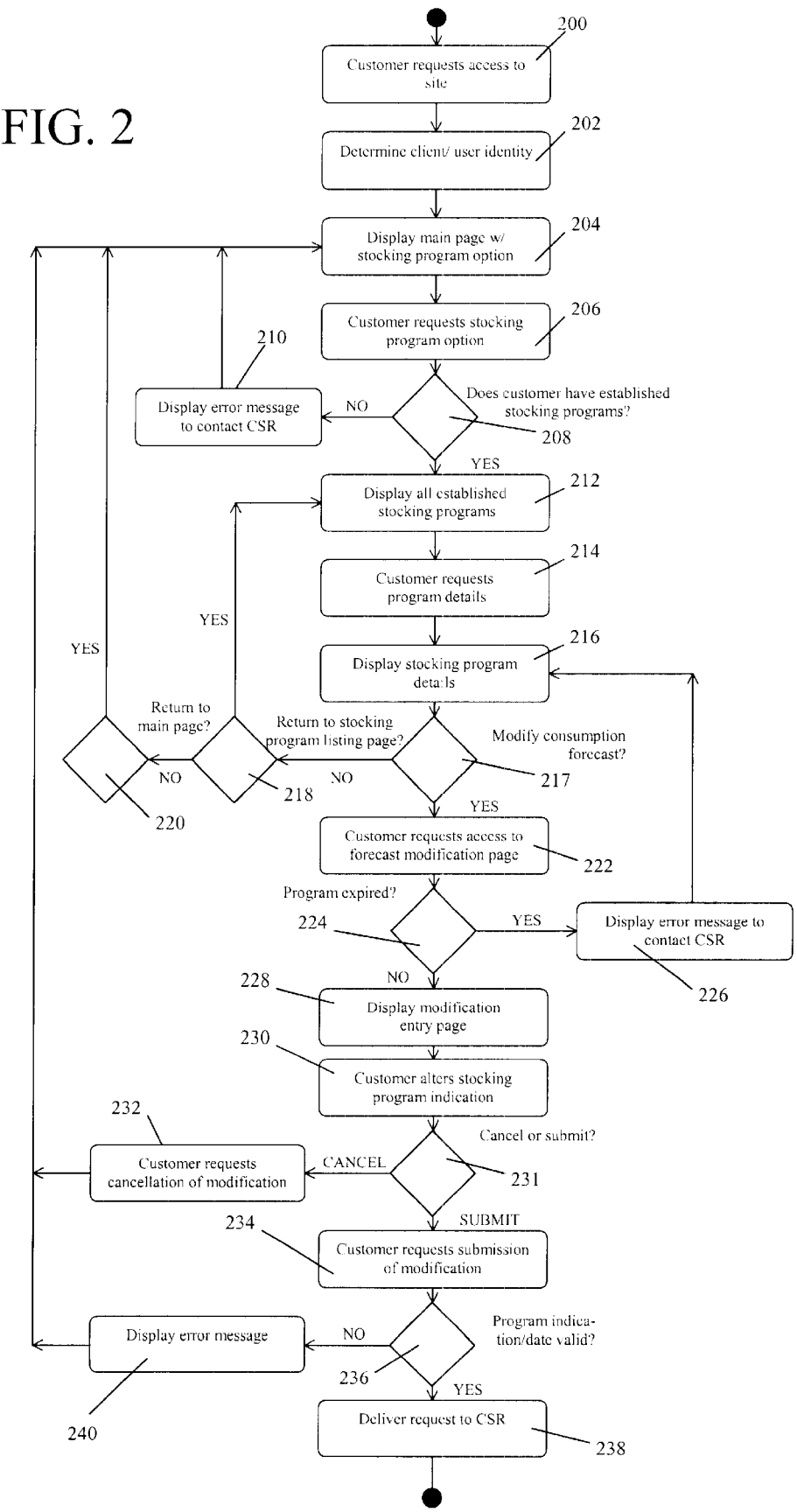
FIG. 2 is a flow chart describing a process for enabling commercial web site users to monitor and modify a forecast of an established stocking program over the network of FIG. 1.

Referring now to FIG. 2, there is illustrated a flow chart describing one embodiment of a method for enabling purchasers in an electronic commercial transactions to monitor and modify the status of stocking programs. This method can be implemented by a software program resident in one or more servers associated with the supplier.

In step 200, the server 14 receives a request by the client 12 to access the web site. Once the request is received by the server 14, the process continues to step 202 in which the server 14 interacts with the client 12, in a conventional manner, to determine the identity of the particular customer operating the client 12. One conventional method of determining identity is the logon form briefly described above, although any suitable method for identifying a particular customer user may be utilized (e.g., cookies, etc.). Upon identification of the particular customer, the server displays to the customer, in step 204, a main web site page including a menu of possible web site options, including a "Review Stocking Programs" option. In step 206, the server receives a request by the customer to display the "Review Stocking Programs" option. In step 208, upon selection of the "Review Stocking Programs" option, the server accesses a database including customer information and determines whether the particular customer has previously established at least one stocking program with the supplier. If it is determined that the particular customer does not have any previously established stocking programs, the server displays, in step 210, a message informing the customer that no stocking programs have been established and directs the customer to contact a customer service representative (CSR) for additional information.

If, however, it is determined that the particular customer does have at least one previously established stocking program, the server displays, in step 212, a web page listing of all such programs. The customer may then request that the server display the program details for a particular stocking program in step 214. Such a request may be accomplished by any suitable method, including hyperlinks, forms, etc. Upon receiving a request to view the details of a particular stocking program, the server displays, in step 216, a web page including a detailed description of the terms of the selected stocking program. Such details preferably include: the order number, the item number for the product ordered, the unit price of the product, the start date of the program, and the expiration date of the program. Also displayed are the consumption forecast for the upcoming month, the consumption forecast and actual consumption for the current month, the forecast consumption and the actual consumption for the previous six months, and a numerical value representing the accuracy of the previous six month's forecast. Also included in the display of detailed information are options to modify the forecast, return to the complex order listing web page, or return to the main web site page.

The customer may then review the information displayed by the server in step 216 and determine, in step 217, whether they wish to modify the forecast for a given stocking program. If the customer does not wish to modify the forecast, they may request, in step 218, that the server return them to the stocking program listing page. Alternatively, the customer may request, in step 220, that the server return them to the main web site page.

If the customer desires to modify the forecast, they request forecast modification in step 222. Upon receiving such a request, the server determines whether the stocking program is expired in step 224. If it is determined that the order is expired, a message is displayed to the customer, in step 226, indicating that the selected program has expired and that they should contact their CSR. If it is determined that the program is not expired, the server displays a modification entry page, in step 228, in which the user enters information regarding the manner in which they would like to modify the forecast. The modification entry page may take any suitable form, including electronic mail correspondence and html-based forms. Generally, a forecast modification includes a modification to the amount of product consumed by the purchaser in the predetermined period. Preferably, the chosen method of modification entry includes an indication as to the particular stocking program which is being modified. By default, this indication indicates the particular stocking program whose details were last viewed. However, in step 230, the user may alter the stocking program indication so as to request a modification to a stocking program other than the most recently viewed program. Alteration of the stocking program indication is desirable in instances where multiple program forecasts are similarly changed and eliminates the need to display the details of each program prior to modification of its forecast.

The modification entry page also includes options to cancel the modification, and submit the modification. Upon receipt of a request to cancel the modification in step 232, the server returns the customer to the stocking program listing web page. Upon receipt of a forecast modification in step 234, the server determines, in step 236 whether the stocking program indication is valid. If so, in step 238, the server delivers the submitted modification to appropriate customer service personnel for implementation. However, if the stocking program indication is invalid, the server, in step 240, displays an error message indicating that the program indication is invalid and returns the user to the modification entry page.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for enabling commercial web site users to monitor and modify an established stocking program consumption forecast over a computer network, comprising the steps of:

receiving, at a web site server associated with a supplier, a request for access to the web site, by a client associated with a customer, determining an identity of the customer, retrieving, using the determined identity, information regarding at least one established stocking program from a database associated with the web site server, wherein the stocking program comprises an agreement between the supplier and the customer to guarantee availability of a stocking program item based upon the consumption forecast for the item, displaying, to the customer, a listing of at least one established stocking program, receiving, at the web site server, a selection of a particular stocking program, receiving, at the server, a request to view a stocking program details page for the selected stocking program, displaying, to the customer, the stocking program details page for the selected stocking program, wherein the stocking program details page includes at least a future consumption forecast, a current consumption forecast, a current actual consumption, a historical consumption forecast, a historical actual consumption, and a numerical value representing the accuracy of the historical consumption forecast, receiving, at the web site server, a request to modify the current and/or future consumption forecast of the particular stocking program, and delivering the request to the supplier over the computer network.

2. The method of claim 1, wherein said step of retrieving information regarding at least one established stocking program comprises retrieving information regarding all previously established stocking programs.

3. The method of claim 1, further including the steps of:

displaying, to the customer, a main web page having a stocking program option, receiving, at the server, a request to view a stocking program listing page, displaying, to the customer, the stocking program listing page provided the customer has at least one established stocking program, and displaying, to the customer, an error message if the customer does not have at least one established stocking program.

4. The method of claim 3, further including the steps of:

receiving, at the server, a request to view a modification entry web page, displaying, to the customer, a modification entry web page, receiving, at the server, forecast modification information, and delivering, to the supplier, the forecast modification information.

5. A server in communication with a computer network including a plurality of user computer terminals, the server including a memory storing machine readable computer code comprising:

one of more instructions for receiving, from a customer, a request for access to a web site, one of more instructions for determining an identity of the customer, one of more instructions for displaying to the customer, a listing of one or more established stocking programs, one or more instructions for receiving, at the web site server, a selection of a particular stocking program, one or more instructions for receiving, at the server, a request to view a stocking program details page for the selected stocking program, one or more instructions for displaying, to the customer, the stocking program details page for the selected stocking program, wherein the stocking program details page includes at least a future consumption forecast, a current consumption forecast, a current actual consumption, a historical consumption forecast, a historical actual consumption, and a numerical value representing the accuracy of the historical consumption forecast, one or more instructions for receiving a request to modify the current and/or future consumption forecast for the selected stocking program, and one or more instructions for delivering the received request to the supplier over the computer network.

6. The server of claim 5, wherein the one or more instructions for retrieving information regarding at least one established stocking program further comprises one or more instructions for retrieving information regarding all previously established stocking programs.

7. The server of claim 5, wherein the machine readable computer code further comprises:

one or more instructions for displaying, to the customer, a main web page having a stocking program option, one or more instructions for receiving, at the server, a request to view a stocking program listing page, one or more instructions for displaying, to the customer, the stocking program listing page provided the customer has at least one established stocking program, and one or more instructions for displaying, to the customer, an error message if the customer does not have at least one established stocking program.

8. The server of claim 4, wherein the machine readable computer code further comprises:

one or more instructions for receiving, at the server, a request to view a modification entry web page, one or more instructions for displaying, to the customer, a modification entry web page, one or more instructions for receiving, at the server, forecast modification information, and one or more instructions for delivering, to the supplier, the forecast modification information.

9. A system for enabling commercial web site users to establish releases of quantities of products included in a complex purchase order, comprising:

a server associated with a supplier, said server hosting at least one web page, a client associated with a customer, said client being connected to the server through the computer network for access to the at least one web page, said server including means for identifying the customer, said server including a database for storing stocking program information associated with the customer, said stocking program information comprising a listing of all established stocking programs placed by the customer with the supplier, wherein the stocking program comprises an agreement between the supplier and the customer to guarantee availability of a stocking program item based upon the consumption forecast for the item, said server including means for receiving a selection of a particular stocking program, said server including means for receiving a request to view a stocking program details page for the selected stocking program, said server including means for displaying, to the customer, the stocking program details page for the selected stocking program, wherein the stocking program details page includes at least a future consumption forecast, a current consumption forecast, a current actual consumption, a historical consumption forecast, a historical actual consumption, and a numerical value representing the accuracy of the historical forecast, said server including means for receiving a request from the customer to modify the current and/or future consumption forecast for a particular stocking program selected from the one or more established complex orders, and said server including means for electronically delivering the request to the supplier.

10. The system of claim 9, wherein said means for retrieving information regarding at least one established stocking program further comprises means for retrieving information regarding all previously established stocking programs.

11. The system of claim 9, further comprising:

means for displaying, to the customer, a main web page having a stocking program option, means for receiving, at the server, a request to view a stocking program listing page, means for displaying, to the customer, the stocking program listing page provided the customer has at least one established stocking program, and means for displaying, to the customer, an error message if the customer does not have at least one established stocking program.

12. The system of claim 11, further comprising:

means for receiving, at the server, a request to view a modification entry web page, means for displaying, to the customer, a modification entry web page, means for receiving, at the server, forecast modification information, and means for delivering, to the supplier, the forecast modification information.

* * * * *